(12) United States Patent
Liu (10) Patent No.: US 11,287,924 B2
(45) Date of Patent: Mar. 29, 2022

(54) TOUCH SUBSTRATE, TOUCH DRIVING METHOD AND ELECTRONIC DEVICE

(71) Applicants: Hefei Xinsheng Optoelectronics Technology Co., Ltd., Anhui (CN); BOE Technology Group Co., Ltd., Beijing (CN)

(72) Inventor: Guodong Liu, Beijing (CN)

(73) Assignees: Hefei Xinsheng Optoelectronics Technology Co., Ltd., Anhui (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 16/968,282

(22) PCT Filed: Jan. 22, 2020

(86) PCT No.: PCT/CN2020/073679
§ 371 (c)(1),
(2) Date: Aug. 7, 2020

(87) PCT Pub. No.: WO2020/156401
PCT Pub. Date: Aug. 6, 2020

(65) Prior Publication Data
US 2021/0034217 A1 Feb. 4, 2021

(30) Foreign Application Priority Data
Jan. 30, 2019 (CN) .......................... 201910093888.0

(51) Int. Cl.
*G06F 3/041* (2006.01)
(52) U.S. Cl.
CPC ................ *G06F 3/04166* (2019.05)

(58) Field of Classification Search
CPC .... G06F 3/0416; G06F 3/04166; G06F 3/044; G06F 2203/04108
See application file for complete search history.

(56) References Cited

U.S. PATENT DOCUMENTS

2008/0192014 A1* 8/2008 Kent ...................... G06F 3/041
345/173
2008/0278450 A1* 11/2008 Lashina ................ G06F 3/0488
345/173

(Continued)

FOREIGN PATENT DOCUMENTS

| CN | 206388154 U | 8/2017 |
| CN | 108319370 A | 7/2018 |

(Continued)

*Primary Examiner* — Priyank J Shah
(74) *Attorney, Agent, or Firm* — Banner & Witcott, Ltd.

(57) ABSTRACT

Disclosed are a touch substrate, a touch driving method and an electronic device. By arranging a first floating electrode region and a second floating electrode region which are sequentially arranged along a first direction and a third floating electrode region and a fourth floating electrode region which are sequentially arranged along a second direction, and by arranging a plurality of first touch electrode groups which are sequentially arranged along a second direction and a plurality of second touch electrode groups which are sequentially arranged along the first direction, each first touch electrode group includes a first floating touch electrode in the first floating electrode region and a second floating touch electrode in the second floating electrode region, and each second touch electrode group includes a third floating touch electrode in the third floating electrode region and a fourth floating touch electrode in the fourth floating electrode region.

18 Claims, 5 Drawing Sheets

(56) References Cited

U.S. PATENT DOCUMENTS

| | | | |
|---|---|---|---|
| 2010/0026656 A1* | 2/2010 | Hotelling | G06F 3/0445 |
| | | | 345/174 |
| 2014/0071360 A1 | 3/2014 | Chang et al. | |
| 2017/0153749 A1* | 6/2017 | Noguchi | G06F 3/04164 |
| 2017/0192607 A1* | 7/2017 | Chai | G06F 3/04164 |
| 2018/0018029 A1* | 1/2018 | Lim | G06F 3/0445 |
| 2018/0329569 A1* | 11/2018 | Suzuki | G06F 3/04166 |
| 2019/0243481 A1 | 8/2019 | Tian et al. | |

FOREIGN PATENT DOCUMENTS

| | | |
|---|---|---|
| CN | 208141353 U | 11/2018 |
| CN | 109814758 A | 5/2019 |

* cited by examiner

TOUCH SUBSTRATE, TOUCH DRIVING METHOD AND ELECTRONIC DEVICE

CROSS REFERENCE TO RELATED APPLICATIONS

This application is a U.S. National Phase Entry of International Application No. PCT/CN2020/073679 filed on Jan. 22, 2020, designating the United States of America and claiming priority to Chinese Patent Application No. 201910093888.0 filed on Jan. 30, 2019. The present application claims priority to and the benefit of the above-identified applications and the above-identified applications are incorporated by reference herein in their entirety.

TECHNICAL FIELD

Embodiments of the present disclosure relate to a touch substrate, a touch driving method of the touch substrate, and an electronic device.

BACKGROUND

With the rapid development of science and technology, various touch technologies have more and more widely used in electronic devices.

Floating touch technology is a new touch technology. With the floating touch technology, the touch function can be realized even if the touch object (e.g. a finger of a user) does not touch the touch screen of the electronic device. However, the common floating touch technology does not support multi-touch.

SUMMARY

At least one embodiment of the present disclosure provides a touch substrate, which includes: a base substrate having a floating electrode region, wherein the floating electrode region includes a first floating electrode region and a second floating electrode region sequentially arranged along a first direction, the floating electrode region further includes a third floating electrode region and a fourth floating electrode region sequentially arranged along a second direction, the second direction is intersected with the first direction, and the first floating electrode region, the third floating electrode region, the second floating electrode region, and the fourth floating electrode region are sequentially arranged along a clockwise direction; a plurality of floating touch electrodes in the floating electrode region of the base substrate, wherein the plurality of floating touch electrodes include a plurality of first touch electrode groups sequentially arranged along the second direction, each of the plurality of first touch electrode groups includes a first floating touch electrode in the first floating electrode region and a second floating touch electrode in the second floating electrode region, the plurality of floating touch electrodes further include a plurality of second touch electrode groups sequentially arranged along the first direction, each of the plurality of second touch electrode groups includes a third floating touch electrode in the third floating electrode region and a fourth floating touch electrode in the fourth floating electrode region; and a plurality of signal lines on the base substrate, wherein the first floating touch electrode and the second floating touch electrode included in a same first touch electrode group are electrically connected with different ones of the signal lines, and the third floating touch electrode and the fourth floating touch electrode included in a same second touch electrode group are electrically connected with different ones of the signal lines.

For example, the base substrate further has a central region, and the floating electrode region is a frame region at a periphery of the central region.

For example, the touch substrate further includes: a floating touch control circuit, configured to: apply a driving signal to the first floating touch electrode and the second floating touch electrode included in the same first touch electrode group to generate a non-zero voltage difference between the first floating touch electrode and the second floating touch electrode; in a process of applying the driving signal, apply a sensing signal to the third floating touch electrodes included in the plurality of second touch electrode groups, and detect an output signal of the fourth floating touch electrodes included in the plurality of second touch electrode groups.

For example, at least one of the driving signal and the sensing signal is an alternating current signal.

For example, the floating touch control circuit is configured to: drive the plurality of first touch electrode groups one by one; and/or apply the sensing signal to the third floating touch electrodes included in the plurality of second touch electrode groups one by one, and detect the output signal of the fourth floating touch electrodes included in the plurality of second touch electrode groups one by one.

For example, in the same first touch electrode group, one of the first floating touch electrode and the second floating touch electrode is located between two ends, which are sequentially arranged along the second direction, of the other of the first floating touch electrode and the second floating touch electrode.

For example, in an N-th first touch electrode group, the first floating touch electrode is located between two ends, which are sequentially arranged along the second direction, of the second floating touch electrode; and in a (N+1)-th first touch electrode group adjacent to the N-th first touch electrode group, the second floating touch electrode is located between two ends, which are sequentially arranged along the second direction, of the first floating touch electrode.

For example, for the plurality of first touch electrode groups, each first floating touch electrode corresponds to one second floating touch electrode, and each second floating touch electrode corresponds to one first floating touch electrode.

For example, an orthographic projection of a part of the plurality of signal lines on the base substrate is overlapped with an orthographic projection of a part of the plurality of floating touch electrodes on the base substrate.

For example, a distance between adjacent ones of the plurality of first touch electrode groups and a distance between adjacent ones of the plurality of second touch electrode groups are both greater than or equal to 1 mm.

For example, in the first direction, a distance between the first floating touch electrode and the second floating touch electrode included in the same first touch electrode group is greater than or equal to 1 mm.

For example, in both the first direction and the second direction, sizes of the first floating touch electrode and the second floating touch electrode are all greater than or equal to 1 mm.

For example, in the first direction, a ratio of a distance between the first floating touch electrode and the second floating touch electrode included in the same first touch electrode group to a size of each of the first floating touch electrode and the second floating touch electrode is greater than or equal to 1.

For example, the ratio is greater than or equal to 100.

For example, the touch substrate further includes: a light shielding portion, wherein the plurality of floating touch electrodes and the plurality of signal lines are located within a region where an orthographic projection of the light shielding portion on the base substrate is located.

At least one embodiment of the present disclosure provides an electronic device, which includes the touch substrate according to any one of the above embodiments.

For example, the electronic device further includes: a non-floating touch structure, wherein the floating electrode region is at a periphery of an orthographic projection of the non-floating touch structure on the base substrate.

For example, the electronic device further includes: a non-floating touch device, including an array substrate and the non-floating touch structure, wherein the array substrate includes a plurality of switches arranged in an array; and a bonding adhesive, located between the non-floating touch device and the touch substrate and bonding the non-floating touch device to the touch substrate.

For example, the array substrate is a display panel.

At least one embodiment of the present disclosure provides a touch driving method of the touch substrate according to any one of the above embodiments, which includes: applying a driving signal to the first floating touch electrode and the second floating touch electrode included in the same first touch electrode group to generate a non-zero voltage difference between the first floating touch electrode and the second floating touch electrode; and in a process of applying the driving signal, applying a sensing signal to the third floating touch electrodes included in the plurality of second touch electrode groups, and detecting an output signal of the fourth floating touch electrodes included in the plurality of second touch electrode groups.

BRIEF DESCRIPTION OF THE DRAWINGS

In order to clearly illustrate the technical solutions of the embodiments of the disclosure, the drawings of the embodiments will be briefly described in the following; it is obvious that the described drawings are only related to some embodiments of the disclosure and thus are not limitative to the disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. Also, the terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

The embodiments of the present disclosure provide a touch substrate, a manufacturing method of the touch substrate, a touch driving method of the touch substrate, and an electronic device. In the embodiments of the present disclosure, the touch substrate is provided with a plurality of floating touch electrode rows and a plurality of floating touch electrode columns. In the process of applying a driving signal to a plurality of floating touch electrodes included in a same floating touch electrode row to generate a floating touch electric field, a sensing signal is applied to the plurality of floating touch electrode columns, and an output signal of the plurality of floating touch electrode columns is detected; alternatively, in the process of applying a driving signal to a plurality of floating touch electrodes included in a same floating touch electrode column to generate a floating touch electric field, a sensing signal is applied to the plurality of floating touch electrode rows, and an output signal of the plurality of floating touch electrode rows is detected. When a touch object approaches the floating touch electrodes (at the moment, the touch object is floating above the outermost surface of the touch substrate, that is, the touch object does not contact the outermost surface), the floating touch electric field will change so as to change the output signal, and therefore, the row and column coordinates of the touch position can be respectively obtained according to the floating touch electrode row and the floating touch electrode column which is related to the changed output signal. In the case where a plurality of touch objects are used for a floating touch operation, each touch position can be detected so as to realize multi-point floating touch. For example, floating touch functions such as glove operation (i.e. realizing a touch operation in the case of wearing a glove), automatic wake-up, position tracking (e.g. the cursor in the touch region moves along with the movement of the touch objects), touch keys, swing gestures, rotating touch, etc., can be realized, thereby increasing novel experiences for users and opening up a new field of man-machine interaction modes.

Figure 1A:
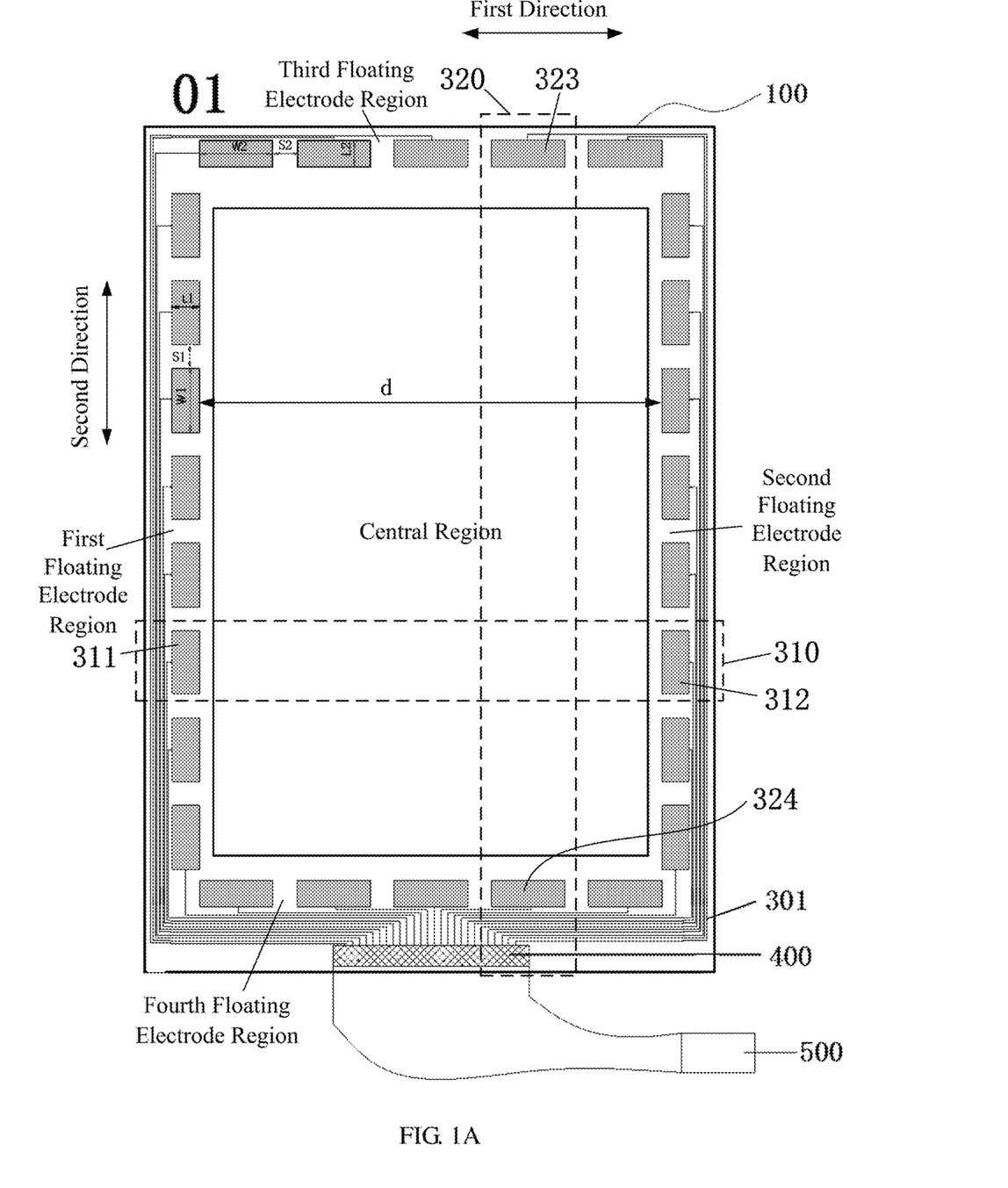
FIG. 1A is a schematic top view of a touch substrate according to an embodiment of the disclosure.
Figure 1B:
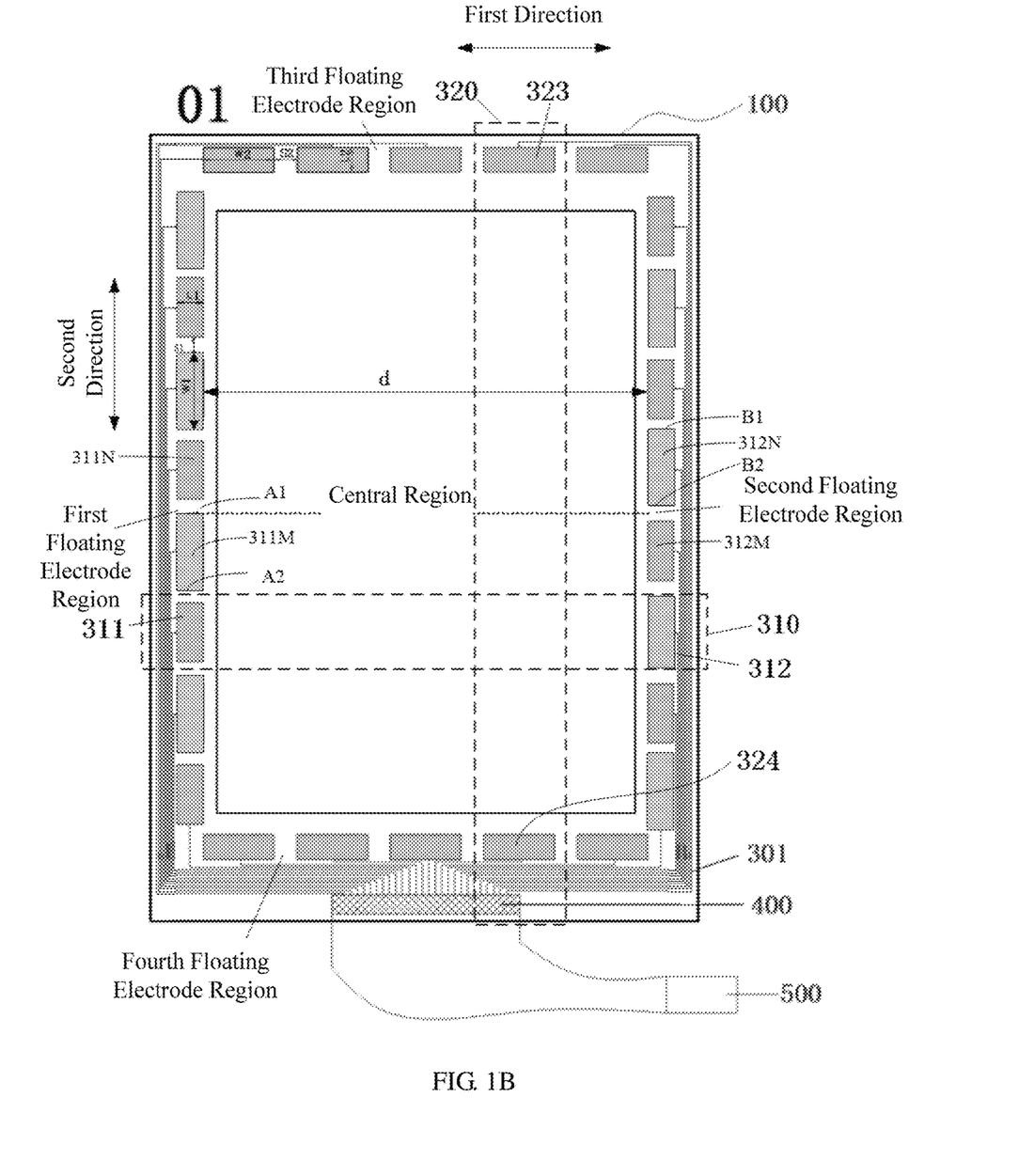
FIG. 1B is a schematic top view of a touch substrate according to an embodiment of the disclosure.
Figure 1C:
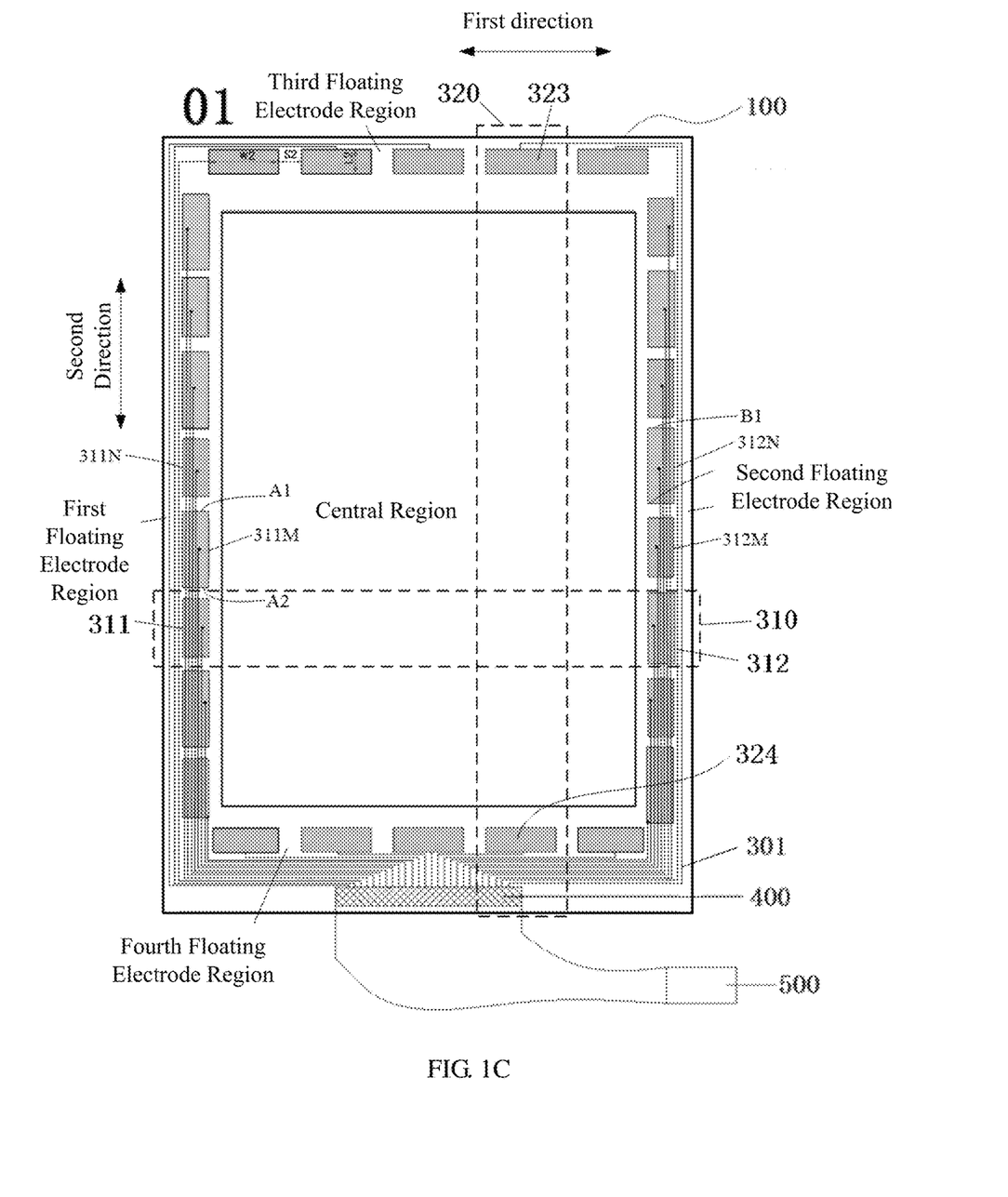
FIG. 1C is a schematic top view of a touch substrate according to an embodiment of the disclosure.
Figure 2:
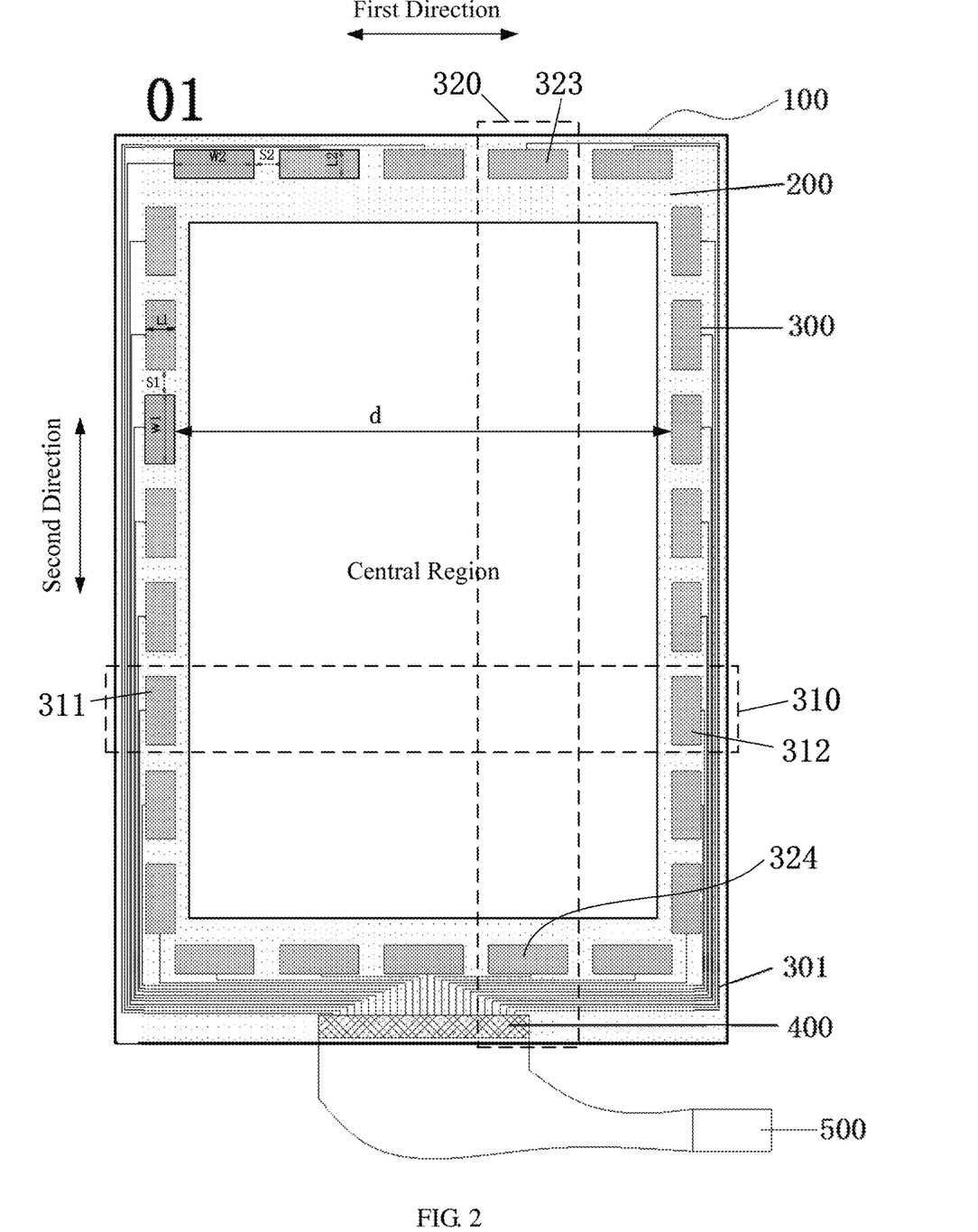
FIG. 2 is a schematic top view of a touch substrate according to an embodiment of the disclosure.

As shown in FIGS. 1A-2, at least one embodiment of the present disclosure provides a touch substrate 01, which includes a base substrate 100, a plurality of floating touch electrodes spaced apart and electrically insulated from each other on the base substrate 100 (see rectangular shaded blocks in FIGS. 1A-2), and leads 301 located on the substrate 100 and electrically connected to the floating touch electrodes, respectively. For example, each floating touch electrode is electrically connected to one signal line 301 and each signal line 301 is electrically connected to one floating touch electrode. For example, the touch substrate 01 further includes a floating touch control circuit (e.g., an integrated circuit) 500, which is electrically connected to the floating touch electrodes through the signal lines 301, so as to drive the floating touch electrodes to realize a floating touch function. For example, the touch substrate 01 further includes a flexible printed circuit board, the flexible printed circuit board is located in a flexible printed circuit board bonding region 400 and electrically connects the signal lines 301 with the floating touch control circuit 500.

As shown in FIGS. 1A-2, the base substrate 100 has a floating electrode region, that is, the plurality of floating touch electrodes described above are located in the floating electrode region. The floating electrode region includes a first floating electrode region and a second floating electrode region sequentially arranged along a first direction, and includes a third floating electrode region and a fourth floating electrode region sequentially arranged along a second direction, the second direction is intersected with the first direction (e.g., the second direction is substantially perpendicular to the first direction). The first floating electrode region, the third floating electrode region, the second floating electrode region and the fourth floating electrode region are sequentially arranged along a clockwise direction, that is, the third floating electrode region and the fourth floating electrode region are located between the first floating electrode region and the second floating electrode region in the first direction, and the fourth floating electrode region is located between the third floating electrode region and the flexible printed circuit board bonding region 400 in the second direction.

For example, as shown in FIGS. 1A-2, the base substrate 100 further has a central region (e.g., a region in which no floating touch electrode is provided, and the region is, for example, a transparent window region), and the floating electrode region is a frame region located at the periphery of the central region. In this case, the central region is located between the first floating electrode region and the second floating electrode region in the first direction, and the central region is located between the third floating electrode region and the fourth floating electrode region in the second direction. By setting the frame region close to the edges of the base substrate 100 as the floating electrode region, the space utilization rate of the base substrate 100 can be improved.

For example, in the case where the touch substrate 01 is applied to a display device, the central region of the base substrate 100 is a display region for displaying a picture, and the frame region is a non-display region; alternatively, in the case where the touch substrate 01 is applied to a light emitting device, the central region of the base substrate 100 is a light emitting region that allows light to pass through, and the frame region is a non-light emitting region. In other embodiments, the touch substrate 01 can also be applied to other types of electronic devices.

For example, the base substrate 100 includes at least four edges, and the first to fourth floating electrode regions are regions respectively close to the edges of the base substrate 100. The embodiments shown in FIGS. 1A-2 will be described by taking that the plane shape of the base substrate 100 is a quadrilateral as an example. In other embodiments, the plane shape of the base substrate 100 can also be a circle, an ellipse, any other polygon or any other arbitrary shape.

For example, the base substrate 100 is a transparent substrate, such as a glass plate, a quartz plate, or a plastic plate. For example, the base substrate 100 is a hard plate or a flexible plate (correspondingly, the touch substrate 01 is a flexible touch substrate).

As shown in FIGS. 1A-2, the plurality of floating touch electrodes on the base substrate 100 include a plurality of first touch electrode groups 310 (8 first touch electrode groups 310 are taken as an example in FIGS. 1A-2) which are sequentially arranged along the second direction and electrically insulated from each other, and each first touch electrode group 310 includes a first floating touch electrode 311 located in the first floating electrode region and a second floating touch electrode 312 located in the second floating electrode region. The first floating touch electrode 311 and the second floating touch electrode 312 included in a same first touch electrode group 310 are electrically connected with different ones of the signal lines 301, so that the first floating touch electrode 311 and the second floating touch electrode 312 included in the same first touch electrode group 310 are electrically insulated from each other. The plurality of floating touch electrodes on the base substrate 100 further includes a plurality of second touch electrode groups 320 (5 second touch electrode groups 320 are taken as an example in FIGS. 1A-2) which are sequentially arranged along the first direction and electrically insulated from each other, and the plurality of second touch electrode groups 320 are electrically insulated from the plurality of first touch electrode groups 310 described above. Each second touch electrode group 320 includes a third floating touch electrode 323 located in the third floating electrode region and a fourth floating touch electrode 324 located in the fourth floating electrode region, and the third floating touch electrode 323 and the fourth floating touch electrode 324 included in a same second touch electrode group 320 are electrically connected with different ones of the signal lines 301, so that the third floating touch electrode 323 and the fourth floating touch electrode 324 included in the same second touch electrode group 320 are electrically insulated from each other.

It should be noted that FIGS. 1A-2 are described by taking that, the first floating touch electrode 311 and the second floating touch electrode 312 included in the first touch electrode group 310 are located in a same floating touch electrode row (that is, each floating touch electrode row includes a first touch electrode group 310), and the third floating touch electrode 323 and the fourth floating touch electrode 324 included in the second touch electrode group 320 are located in a same floating touch electrode column (that is, each floating touch electrode column includes a second touch electrode group 320), as an example. In other embodiments, it is also allowed that the first floating touch electrode 311 and the second floating touch electrode 312 included in the first touch electrode group 310 are located in a same floating touch electrode column, and the third floating touch electrode 323 and the fourth floating touch electrode 324 included in the second touch electrode group 320 are located in a same floating touch electrode row, that is, each floating touch electrode row includes a second touch electrode group 320 and each floating touch electrode column includes a first touch electrode group 310.

In addition, as shown in FIGS. 1A-2, each first touch electrode group 310 includes only one first floating touch electrode 311 and one second floating touch electrode 312. In other embodiments, it is also allowed that each first touch electrode group 310 includes a plurality of first floating touch electrodes 311 and a plurality of second floating touch electrodes 312, and the plurality of first floating touch electrodes 311 and the plurality of second floating touch electrodes 312 are sequentially arranged along the first direction. On the premise of not increasing the width of the frame region, by making each first touch electrode group 310 include one first floating touch electrode 311 and one second floating touch electrode 312 only, the first floating touch electrode 311 and the second floating touch electrode 312 can be made to have a relatively large size in the first direction, thereby facilitating the first floating touch electrode 311 and the second floating touch electrode 312 to have a relatively large area, and further facilitating the enhancement of the electric field between the first floating electrode region and the second floating electrode region. That is to say, the manner in which each first touch electrode group 310 includes only one first floating touch electrode 311 and one second floating touch electrode 312 is favorable for enhancing the floating touch electric field and for designing a narrow frame.

For example, as shown in FIGS. 1A-2, in the same first touch electrode group 310, one of the first floating touch electrode 311 and the second floating touch electrode 312 is located between two ends, which are sequentially arranged along the second direction, of the other of the first floating touch electrode 311 and the second floating touch electrode 312. That is, in each first touch electrode group 310 of the plurality of first touch electrode groups 310 included in the touch substrate, the first floating touch electrode 311 is located between two ends of the second floating touch electrode 312 that are sequentially arranged in the second direction. Alternatively, in each first touch electrode group 310 of the plurality of first touch electrode groups 310 included in the touch substrate, the second floating touch electrode 312 is located between two ends of the first floating touch electrode 311 that are sequentially arranged along the second direction. Alternatively, in at least one first touch electrode group 310 of the plurality of first touch electrode groups 310 included in the touch substrate, the first floating touch electrode 311 is located between two ends of the second floating touch electrode 312 that are sequentially arranged along the second direction, and in at least another first touch electrode group 310 of the plurality of first touch electrode groups 310 included in the touch substrate, the second floating touch electrode 312 is located between two ends of the first floating touch electrode 311 that are sequentially arranged along the second direction. Thus, it is conducive to increasing the facing area of the first floating touch electrode 311 and the second floating touch electrode 312, thereby facilitating the enhancement of the floating touch electric field.

For example, as shown in FIG. 1A, in each first touch electrode group 310, two ends of the first floating touch electrode 311 that are sequentially arranged in the second direction are substantially aligned with two ends of the second floating touch electrode 312 that are sequentially arranged in the second direction, respectively. That is, the first floating touch electrode 311 is located between the two ends of the second floating touch electrode 312 that are sequentially arranged in the second direction, and the second floating touch electrode 312 is located between the two ends of the first floating touch electrode 311 that are sequentially arranged in the second direction. That is to say, the first floating touch electrode 311 does not exceed the second floating touch electrode 312 in the second direction, and the second floating touch electrode 312 does not exceed the first floating touch electrode 311 in the second direction. It should be noted that "substantially aligned" here refers to ignoring the influence of the deviation of manufacturing process.

For example, in order to avoid the deviation of manufacturing process and further enhance the floating touch electric field, the first floating touch electrode 311 and the second floating touch electrode 312 can be staggered, and one of them does not exceed the other in the second direction. For example, as shown in FIG. 1B and FIG. 1C, in the N-th (N is greater than or equal to 1) first touch electrode group 310, the first floating touch electrode 311N is located between two ends (referring to B1 and B2 in FIG. 1B or FIG. 1C), which are sequentially arranged along the second direction, of the second floating touch electrode 312N. In the (N+1)-th first touch electrode group 310 adjacent to the N-th first touch electrode group 310, the second floating touch electrode 312M is located between two ends (referring to A1 and A2 in FIG. 1B or FIG. 1C), which are sequentially arranged along the second direction, of the first floating touch electrode 311M that are sequentially arranged in the second direction.

For example, as shown in FIGS. 1A-2, for the plurality of first touch electrode groups 310, each first floating touch electrode 311 corresponds to one second floating touch electrode 312, and each second floating touch electrode 312 corresponds to one first floating touch electrode 311. By making the first floating touch electrodes 311 in one-to-one correspondence with the second floating touch electrodes 312, it is advantageous to ensure the formation of a stable floating touch electric field (quasi-electrostatic field).

For example, as shown in FIG. 1A, FIG. 1B, and FIG. 2, except for the signal lines 301 electrically connected to the fourth floating touch electrodes 324, the rest of the signal lines 301 have a body portion extending in the second direction, and the body portion does not overlap with the floating touch electrodes (i.e., an orthographic projection of the body portion on the substrate 100 does not overlap with an orthographic projection of the floating touch electrodes on the substrate 100).

In some embodiments, an orthographic projection of part of the plurality of signal lines 301 on the substrate 100 can overlap with an orthographic projection of part of the plurality of floating touch electrodes on the substrate 100. For example, as shown in FIG. 1C, in the first floating electrode region, a part of the signal lines 301 overlap with the first floating touch electrodes 311 electrically connected thereto (black dots in FIG. 1C indicate that the signal lines are electrically connected with the first floating touch electrodes 311 through via holes penetrating through an insulation layer), and also overlap with other first floating touch electrodes 311; in the second floating electrode region, a part of the signal lines 301 overlap with the second floating touch electrodes 312 electrically connected thereto, and also overlap with other first floating touch electrodes 311. By electrically connecting the body portions of a part of the signal lines (i.e., the part of the signal lines extending in the second direction) with a part of the floating touch electrodes, it is beneficial to reducing the space occupied by the signal lines and increasing the areas of the floating touch electrodes, thus facilitating the enhancement of the quasi-electrostatic field. That is to say, this is conducive to enhancing the floating touch electric field and to the design of a narrow frame. On the other hand, because the floating touch electric field is formed between the first floating touch electrode 311 and the second floating touch electrode 312, even if the body portions of the signal lines 301 is overlapped with the floating touch electrodes, the floating touch electric field will substantially not be affected.

For example, the floating touch electrodes on the substrate 100 can be made of a metal material, such as aluminum, aluminum alloy, copper, copper alloy, titanium or zirconium, etc., so as to reduce the resistances of the floating touch electrodes; alternatively, the floating touch electrodes can be made of a transparent conductive material, such as metal oxide (e.g., indium tin oxide, indium zinc oxide, indium gallium zinc oxide, etc.), graphene, carbon nanotube, or silver nanowire, etc., so as to reduce the visibility of the floating touch electrodes.

For example, the signal lines 301 on the base substrate 100 can be made of a metal material, such as aluminum, aluminum alloy, copper, copper alloy, titanium or zirconium, etc., so as to reduce the resistances of the signal lines 301; alternatively, the signal lines 301 can be made of a transparent conductive material, such as metal oxide (e.g., indium tin oxide, indium zinc oxide, indium gallium zinc oxide, etc.), graphene, carbon nanotube, or silver nanowire, etc., so as to reduce the visibility of the signal lines 301.

For example, in the case where both the floating touch electrodes and the signal lines 301 are made of a metal material or a transparent conductive material, the floating touch electrodes and the signal lines 301 are located in a same layer and have a same material. That is, the floating touch electrodes and the signal lines 301 are formed by patterning a same thin film, thus simplifying the manufacturing process. In some other embodiments, it is also allowed that the floating touch electrodes are made of a transparent conductive material and the signal lines 301 are made of a metal material, which is conducive to reducing the visibility and the resistances.

For example, in the embodiments shown in FIG. 1A, FIG. 1B and FIG. 2, the floating touch electrodes and the signal lines 301 can both be made of a metal material or both be made of a transparent conductive material, or the floating touch electrode can be made of a transparent conductive material and the signal line 301 can be made of a metal material. For example, in the embodiment shown in FIG. 1C, the floating touch electrodes can be made of a transparent conductive material and the signal lines 301 can be made of a metal material.

For example, as shown in FIG. 2, the base substrate 100 is further provided with a light shielding portion 200, and the floating touch electrodes and the signal lines 301 are located within a region where an orthographic projection of the light shielding portion 200 on the base substrate 100 is located. The light shielding portion 200 is used to shield the floating touch electrodes and the signal lines 301, so as to prevent the user from seeing the floating touch electrodes and the signal lines 301. In addition, in the case where the floating touch electrodes are made of a transparent conductive material, because the floating touch electrodes are transparent, the floating touch electrodes will not be seen by the user even if an alignment deviation between the floating touch electrodes and the light shielding portion occurs.

For example, the light shielding portion 200 is made of a light shielding material, such as black ink, etc.

For example, the light shielding portion 200 and the floating touch electrodes can be located on a same side of the base substrate 100, and for example, the light shielding portion 200 is located between the base substrate 100 and the floating touch electrodes; alternatively, the light shielding portion 200 and the floating touch electrodes are located on different sides of the base substrate 100, that is, the base substrate 100 is located between the light shielding portion 200 and the floating touch electrodes. Similarly, the light shielding portion 200 and the signal lines 301 can be located on the same side or on different sides of the base substrate 100, as long as the light shielding portion 200 can prevent the user from seeing the floating touch electrodes and the signal lines.

For example, the floating touch control circuit 500 is configured to: apply a driving signal to the first floating touch electrode 311 and the second floating touch electrode 312 included in the same first touch electrode group 310 to generate a non-zero voltage difference between the first floating touch electrode 311 and the second floating touch electrode 312 at any time point in a floating touch mode, so as to form a floating touch electric field at the any time point; in the process of applying the driving signal, apply an sensing signal to the third floating touch electrodes 323 included in the plurality of second touch electrode groups 320, and detect an output signal of the fourth floating touch electrodes 324 included in the plurality of second touch electrode groups 320.

Figure 3A:
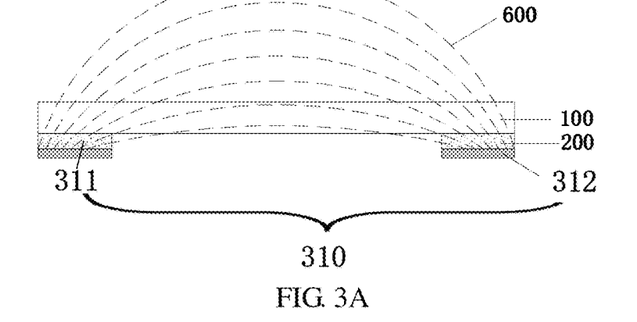
FIG. 3A is a schematic diagram of an electric field formed when a touch substrate provided by an embodiment of the disclosure is not subjected to a floating touch operation.
Figure 3B:
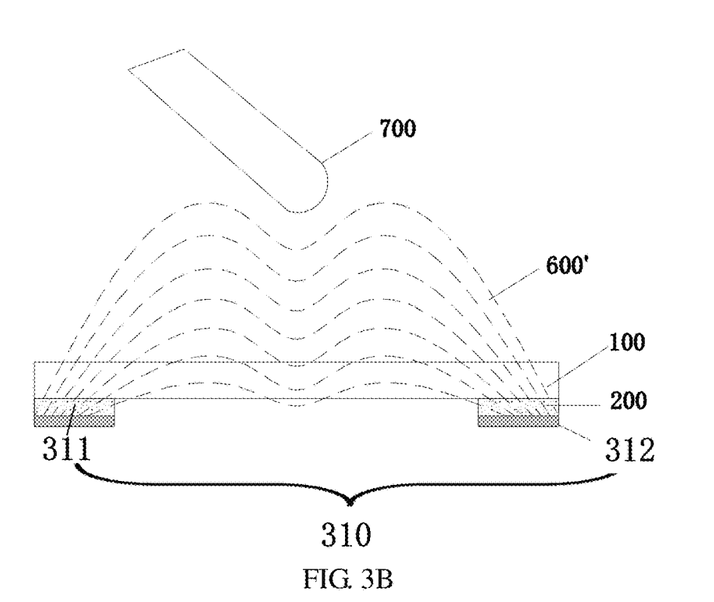
FIG. 3B is a schematic diagram of an electric field formed when a touch substrate provided by an embodiment of the disclosure is subjected to a floating touch operation.

The operation principle of the touch substrate 01 provided by the embodiments of the present disclosure is as follows. As shown in FIG. 3A, the floating touch circuit applies a driving signal to the first floating touch electrode 311 and the second floating touch electrode 312 included in the same first touch electrode group 310 to generate an electric field 600 between the first floating touch electrode 311 and the second floating touch electrode 312; at the same time, a sensing signal is applied to the third floating touch electrodes 323 included in the plurality of second touch electrode groups, and an output signal of the fourth floating touch electrodes 324 included in the plurality of second touch electrode groups are detected. As shown in FIG. 3B, when a touch object 700 (e.g. a finger of a user or other conductor) is floating above the first floating touch electrode 311 and the second floating touch electrode 312 for performing a floating touch operation, the electric field between the first floating touch electrode 311 and the second floating touch electrode 312 is changed (referring to the changed electric field 600'), which causes the output signal of the fourth floating touch electrodes 324 to be changed, so that the touch position can be obtained according to the changed output signal.

For example, the driving signal applied to the first floating touch electrode 311 and the second floating touch electrode 312 are a constant signal or an alternating current (AC) signal. Using an AC signal can reduce the charge residue on these floating touch electrodes and prevent the floating touch electrodes from being heated and burned. Similarly, the sensing signal applied to the third floating touch electrodes 323 can also be a constant signal or an AC signal, and using an AC signal can reduce the charge residue and prevent the floating touch electrodes from being heated and burned.

For example, the AC signal can be a signal whose amplitude changes with time, or a signal whose amplitude remains the same but whose direction changes with time. A preferred AC signal is a signal whose amplitude remains the same but whose direction changes with time, thus reducing the requirement on the chip in the floating touch control circuit.

For example, the non-zero voltage difference generated between the first floating touch electrode 311 and the second floating touch electrode 312 is greater than or equal to 10 volts. By generating a relatively large voltage difference between the first floating touch electrode 311 and the second floating touch electrode 312, a relatively strong electric field can be formed between the first floating touch electrode 311 and the second floating touch electrode 312, which is conducive to realizing remote floating touch.

For example, the floating touch control circuit 500 is configured to: drive the plurality of first touch electrode groups 310 one by one; and/or, apply the sensing signal to the third floating touch electrodes 323 included in the plurality of second touch electrode groups 320 one by one, and detect the output signal of the fourth floating touch electrodes 324 included in the plurality of second touch electrode groups 320 one by one. For example, the driving signal is applied to the plurality of first touch electrode groups 310 one by one; and in the process of applying the drive signal to each first touch electrode group 310, the sensing signal is applied to the third floating touch electrodes 323 of the second touch electrode groups 320 one by one, and the output signal of the fourth floating touch electrodes 324 of the second touch electrode groups 320 are detected one by one. Alternatively, the first touch electrode groups 310 are driven one by one; and in the process of driving each first touch electrode group 310, the sensing signals are simultaneously applied to the third floating touch electrodes 323 of the plurality of second touch electrode groups 320, and the output signals of the fourth floating touch electrodes 324 of the plurality of second touch electrode groups 320 are simultaneously detected. Alternatively, the first touch electrode groups 310 are simultaneously driven; and in the process of driving each first touch electrode group 310, the sensing signals are applied to the third floating touch electrodes 323 of the second touch electrode groups 320 one by one, and the output signals of the fourth floating touch electrodes 324 of the second touch electrode groups 320 are detected one by one.

In these embodiments of the present disclosure, by driving the first touch electrode groups 310 one by one and/or detecting the output signals of the fourth floating touch electrode 324 one by one, the data processing amount of the floating touch control circuit 500 can be reduced, the requirements on the floating touch control circuit 500 can be reduced, and thus the cost can be reduced.

In the case where the base substrate 100 includes a central region, the central region is located between the first floating touch electrode 311 and the second floating touch electrode 312 in the first direction, and the central region is located between the third floating touch electrode 323 and the fourth floating touch electrode 324 in the second direction. In this case, when a driving signal is applied to the first floating touch electrode 311 and the second floating touch electrode 312 included in the same first touch electrode group 310 to generate a floating touch electric field, the floating touch electric field also covers the central region, so the floating touch function can be realized in the central region even though no floating touch electrode is provided in the central region. Therefore, the floating touch electric field covers the floating electrode regions and the central region.

For example, in the first direction, the ratio of the distance d (shown in FIGS. 1A-2) between the first floating touch electrode 311 and the second floating touch electrode 312 included in the same first touch electrode group 310 to the size (referring to L1 in FIGS. 1A-2) of each of the first floating touch electrode 311 and the second floating touch electrode 312 is greater than or equal to 1. For example, the ratio is greater than or equal to 100. In the embodiments of the present disclosure, by making the distance d between the first floating touch electrode 311 and the second floating touch electrode 312 much greater than the size L1 of each of the first floating touch electrode 311 and the second floating touch electrode 312, that is, by making the wave length of the floating touch electric field longer than the size of the floating touch electrode, the floating touch electric field can be equivalent to a quasi-electrostatic field (that is, the field intensities at various positions within the range of the floating touch electric field are approximately equal), thereby reducing the data processing difficulty of the floating touch control circuit.

For example, in the first direction, the distance d between the first floating touch electrode 311 and the second floating touch electrode 312 included in the same first touch electrode group 310 is greater than or equal to 1 mm.

For example, in the first direction, the sizes L1 of the first floating touch electrode 311 and the second floating touch electrode 312 included in the same first touch electrode group 310 are greater than or equal to 1 mm; and in the second direction, the sizes W1 of the first floating touch electrode 311 and the second floating touch electrode 312 included in the same first touch electrode group 310 are greater than or equal to 1 mm, for example, 10 mm-50 mm. By making the first floating touch electrode 311 and the second floating touch electrode 312 have relatively large sizes in both the first direction and the second direction, the areas of the first floating touch electrode 311 and the second floating touch electrode 312 are facilitated to be increased, so that a relatively strong electric field is facilitated to be formed between the first floating touch electrode 311 and the second floating touch electrode 312, and the remote floating touch is facilitated to be realized.

For example, the sizes of the third floating touch electrode 323 and the fourth floating touch electrode 324 included in the second touch electrode group 320 can be referred to those in the first touch electrode group 310. For example, in the first direction, the sizes W2 of the third floating touch electrode 323 and the fourth floating touch electrode 324 included in a same second touch electrode group 320 are greater than or equal to 1 mm, for example, 10 mm-50 mm; and in the second direction, the sizes L2 of the third floating touch electrode 323 and the fourth floating touch electrode 324 included in the second touch electrode group 320 are greater than or equal to 1 mm.

For example, as shown in FIGS. 1A-2, a distance S1 between adjacent first touch electrode groups 310 and a distance S2 between adjacent second touch electrode groups 320 are both greater than or equal to 1 mm. In this way, in can be avoided that the distance between adjacent touch electrode groups is so close as to reduce the positioning accuracy of the touch position. Considering that the area of a finger is usually 5 mm*5 mm, for example, the distance S1 between adjacent first touch electrode groups 310 and the distance S2 between adjacent second touch electrode groups 320 can both be set to 4-5 mm, e.g., 5 mm.

It should be noted that L1 and L2 can be equal or unequal, W1 and W2 can be equal or unequal, and S1 and S2 can be equal or unequal. In addition, the sizes L1 and L2 of the floating touch electrodes can be determined according to the width of the light shielding portion. For example, the width of the light shielding portion of a mobile phone product is about 5 mm, so the sizes L1 and L2 of the floating touch electrodes are less than 5 mm; and because the light shielding portion also shields the signal lines, the sizes L1 and L2 of the floating touch electrodes are about 4 mm. For example, the width of the light shielding portion of a notebook computer product is about 30 mm, and because the light shielding portion also shields the signal lines, the sizes L1 and L2 of the floating touch electrodes are about 20-24 mm. For example, the width of the light shielding portion of a large-sized (e.g., 65 inches or 75 inches) product is about 50 mm, and because the light shielding portion also shields the signal lines, the sizes L1 and L2 of the floating touch electrodes are about 35 mm.

In addition, the shape of each of the plurality of floating touch electrodes on the base substrate 100 can be any shape, such as a polygon, a circle, an ellipse, etc.

In some embodiments, the touch substrate 01 further includes a protective layer covering the light shielding portion 200, the floating touch electrodes and the signal line 301, and the protective layer can protect these structures from being scratched. For example, the material of the protective layer can be an inorganic substance such as $SiO_2$, $Si_3N_4$, SiON, etc., or an organic substance such as polytetrafluoroethylene, etc.

At least one embodiment of the present disclosure provides an electronic device, which includes the touch substrate 01 provided by any one of the above embodiments.

For example, the electronic device can be any electronic product or component, such as an electronic paper, a mobile phone, a tablet computer, a television, a display, a notebook computer, a digital photo frame, a navigator, etc. For example, the electronic device is a flexible electronic device or a non-flexible electronic device.

Figure 4:
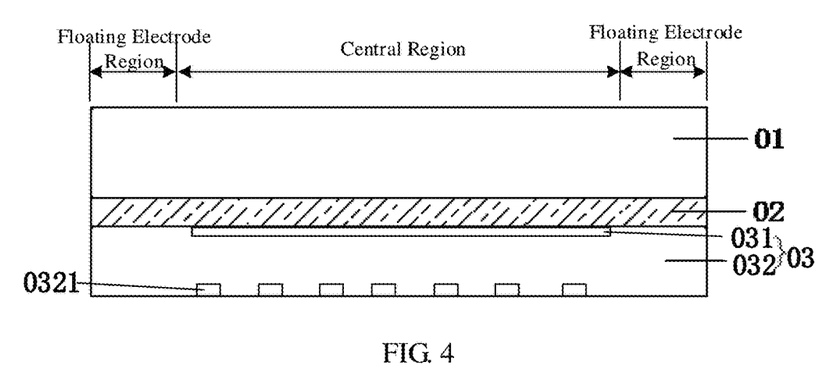
FIG. 4 is a schematic diagram of an electronic device provided by an embodiment of the disclosure.

For example, as shown in FIG. 4, the electronic device further includes a non-floating touch structure 031. The floating electrode region is located at the periphery of an orthographic projection of the non-floating touch structure 031 on the base substrate 100. In this case, an orthographic projection of the non-floating touch structure 031 on the base substrate 100 is located in the central region of the base substrate 100. By making the floating touch electrode at an outer side of a region where the orthographic projection of the non-floating touch structure is located, the signal interference between floating touch and non-floating touch can be reduced, and the touch accuracy, especially the floating touch accuracy, can be improved.

Non-floating touch refers to contact touch, that is, only when a touch object contacts the touch substrate of the electronic device can a touch position be obtained by using the non-floating touch structure 031; and when the touch object does not contact the touch substrate of the electronic device, the touch position cannot be obtained by using the non-floating touch structure 031.

For example, the non-floating touch structure 031 can adopt any type of touch technology such as mutual capacitance touch technology, self-capacitance touch technology, acoustic wave touch technology, optical touch technology or resistive touch technology.

For example, the non-floating touch structure 031 and the floating touch electrode are driven in a time-divisional manner, that is, the floating touch electrodes are not in the working state when the non-floating touch structure 031 is in the working state, and the non-floating touch structure 031 is not in the working state when the floating touch electrodes are in the working state. In this case, when the touch object contacts the touch substrate for performing a touch operation, the touch position is determined according to the non-floating touch structure 031; when the touch object is floating above the touch substrate for performing a touch operation, the touch position cannot be obtained according to the non-floating touch structure 031, but the touch position can be obtained according to the output signal of the floating touch electrodes. By adopting time-divisional driving, signal interference between floating touch and non-floating touch can be reduced, and touch accuracy, especially floating touch accuracy, can be improved.

For example, the non-floating touch structure 031 and the floating touch electrodes are electrically connected with different touch drive control circuits, so as to reduce signal interference between floating touch and non-floating touch, and to improve touch accuracy, especially the floating touch accuracy.

For example, as shown in FIG. 4, the electronic device further includes a non-floating touch device 03, the non-floating touch device 03 includes an array substrate 032 and a non-floating touch structure 031, and the array substrate 032 includes a plurality of switches 0321 arranged in an array. The electronic device further includes a bonding adhesive 02, the bonding adhesive 02 is located between the non-floating touch device 03 and the touch substrate 01 and bonds the non-floating touch device 03 to the touch substrate 01. In this case, the non-floating touch structure 031 is located on one side of the bonding adhesive 02 away from the touch substrate 01, thus increasing the distance between the non-floating touch structure 031 and the floating touch electrodes, reducing signal interference between the floating touch and the non-floating touch, and reducing misoperation.

For example, the array substrate 032 is a liquid crystal panel or an OLED panel or any other type of panel having a structure arranged in an array. For example, the array panel 032 is a display panel for realizing a display function, or a light emitting panel for realizing a light emitting function, or a plate-like structure for realizing other functions.

For example, the array substrate 032 can include a first substrate and a second substrate which are oppositely disposed, and the second substrate is located between the first substrate and the touch substrate; the non-floating touch structure 031 can be located between the first substrate and the second substrate (i.e., in an embedded mode) or on one side of the first substrate away from the second substrate (i.e., in an on-cell mode); or, the non-floating touch structure 031 can be integrated with a display driver of the array substrate 032 (i.e., using TDDI (Touch and Display Driver Integration) technology); or, the non-floating touch structure 031 can be located on one side of the second substrate away from the first substrate.

For example, the bonding adhesive 02 is an optical adhesive or an adhesive of other types. For example, the optical adhesive is a solid glue or a liquid glue or a glue of other types.

For example, the bonding adhesive 02 can bond the non-floating touch device 03 to the touch substrate 01 in a full-bonding mode or in a frame-bonding mode.

For example, the base substrate 100 of the touch substrate 01 is located at the outermost side of the electronic device (that is, the floating touch electrodes are located between the base substrate 100 and the array substrate 032), so that the base substrate 100 plays a role in protecting the floating touch electrodes; and because the touch substrate 01 has a floating touch function, the utilization rate of the touch substrate 01 is improved.

At least one embodiment of the present disclosure further provides a touch driving method of the touch substrate according to any one of the above embodiments. Taking the touch substrate 01 shown in FIGS. 1A-2 as an example, the touch driving method includes: applying a driving signal to the first floating touch electrode 311 and the second floating touch electrode 312 included in the same first touch electrode group 310 to generate a non-zero voltage difference between the first floating touch electrode 311 and the second floating touch electrode 312; and in the process of applying the driving signal, applying a sensing signal to the third floating touch electrodes 323 included in the plurality of second touch electrode groups 320, and detecting an output signal of the fourth floating touch electrodes 324 included in the plurality of second touch electrode groups 320.

For example, the driving signal applied to the first floating touch electrode 311 and the second floating touch electrode 312 are an AC signal, so as to reduce charge residue on these floating touch electrodes. Similarly, the sensing signal applied to the third floating touch electrode 323 can be an AC signal, so as to reduce charge residue.

For example, the non-zero voltage difference generated between the first floating touch electrode 311 and the second floating touch electrode 312 is greater than or equal to 10 volts. By generating a relatively large voltage difference between the first floating touch electrode 311 and the second floating touch electrode 312, a relatively strong electric field can be formed between the first floating touch electrode 311 and the second floating touch electrode 312, which is conducive to realizing remote floating touch.

For example, the plurality of first touch electrode groups 310 are driven one by one; and/or, the sensing signal is applied to the third floating touch electrodes 323 of the second touch electrode groups 320 one by one, and the output signal of the fourth floating touch electrodes 324 of the second touch electrode groups 320 is detected one by one (for example, applying a sensing signal to the third floating touch electrode of a certain second touch electrode group and detecting the output signal of the fourth floating touch electrode of the certain second touch electrode group; then, applying a sensing signal to the third floating touch electrode of a next second touch electrode group and detecting the output signal of the fourth floating touch electrode of the next second touch electrode group). For example, the driving signal is applied to the plurality of first touch electrode groups 310 one by one; and in the process of applying the drive signal to each first touch electrode group 310, the sensing signal is applied to the third floating touch electrodes 323 of the second touch electrode groups 320 one by one, and the output signal of the fourth floating touch electrodes 324 of the second touch electrode groups 320 are detected one by one. Alternatively, the first touch electrode groups 310 are driven one by one; and in the process of driving each first touch electrode group 310, the sensing signals are simultaneously applied to the third floating touch electrodes 323 of the plurality of second touch electrode groups 320, and the output signals of the fourth floating touch electrodes 324 of the plurality of second touch electrode groups 320 are simultaneously detected. Alternatively, the first touch electrode groups 310 are simultaneously driven; and in the process of driving each first touch electrode group 310, the sensing signals are applied to the third floating touch electrodes 323 of the second touch electrode groups 320 one by one, and the output signals of the fourth floating touch electrodes 324 of the second touch electrode groups 320 are detected one by one.

In these embodiments of the present disclosure, by driving the first touch electrode groups 310 one by one and/or detecting the output signals of the fourth floating touch electrode 324 one by one, the data processing amount of the floating touch control circuit 500 can be reduced, the requirements on the floating touch control circuit 500 can be reduced, and thus the cost can be reduced. However, in other embodiments, it is also allowed to simultaneously drive the first touch electrode groups 310, simultaneously apply sensing signals and simultaneously detect output signals, according to actual needs.

At least one embodiment of the present disclosure provides a manufacturing method of a touch substrate. Taking the touch substrate 01 shown in FIGS. 1A-2 as an example, the manufacturing method includes: forming a plurality of floating touch electrodes and a plurality of signal lines on a base substrate 100. The base substrate 100 has a floating electrode region, the floating electrode region includes a first floating electrode region and a second floating electrode region sequentially arranged along a first direction, and includes a third floating electrode region and a fourth floating electrode region sequentially arranged along a second direction, the second direction is intersected with the first direction, and the first floating electrode region, the third floating electrode region, the second floating electrode region and the fourth floating electrode region are sequentially arranged along a clockwise direction; the plurality of floating touch electrodes are located in the floating electrode region of the base substrate 100, the plurality of floating touch electrodes include a plurality of first touch electrode groups 310 sequentially arranged along the second direction, each first touch electrode group 310 includes a first floating touch electrode 311 located in a first floating electrode region and a second floating touch electrode 312 located in a second floating electrode region, the plurality of floating touch electrodes further include a plurality of second touch electrode groups 320 sequentially arranged along the first direction, and each second touch electrode group 320 includes a third floating touch electrode 323 located in a third floating electrode region and a fourth floating touch electrode 324 located in a fourth floating electrode region; the first floating touch electrode 311 and the second floating touch electrode 312 included in to same first touch electrode group 310 are electrically connected to different signal lines, and the third floating touch electrode 323 and the fourth floating touch electrode 324 included in a same second touch electrode group 320 are electrically connected to different signal lines.

The manufacturing sequences of the floating touch electrodes and the signal lines are not limited in the embodiments of the present disclosure. For example, the signal lines are manufactured after the floating touch electrodes are manufactured, or the floating touch electrodes are manufactured after the signal lines are manufactured, or both the floating touch electrodes and the signal lines are manufactured in a same patterning process.

The manufacturing method provided by some embodiments of the present disclosure can further include: manufacturing a light shielding portion (referring to 200 in FIG. 2). For example, in the case where the surface of the base substrate 100 on which the floating touch electrodes and the signal lines are not provided faces a touch object (e.g., a finger of a user), the floating touch electrodes and the signal lines can be manufactured after the light shielding portion is manufactured, so that the light shielding portion shields the floating touch electrodes and the signal lines.

Taking the touch substrate shown in FIG. 2 and FIG. 3A as an example, the manufacturing method provided by the embodiments of the present disclosure includes the following steps.

Step S1: forming a light shielding portion 200 on a base substrate 100.

Step S2: forming a plurality of signal lines 301 in a region where the light shielding portion 200 of the base substrate 100 is located.

For example, signal lines located in a flexible printed circuit board bonding region 400 are also formed in this step.

Step S3: forming a plurality of floating touch electrodes in the region where the light shielding portion 200 of the base substrate 100 is located, so as to obtain the plurality of first touch electrode groups 310 and the plurality of second touch electrode groups 320 described above.

For example, the floating touch electrodes are electrically connected to pins in the flexible printed circuit board (FPC) bonding region 400 through a signal line 301; then, a flexible printed circuit board is bonded in the flexible printed circuit board bonding region 400 via an FOG (FPC on Glass) process, so that the floating touch electrodes are connected to a peripheral floating touch control circuit (e.g., IC) 500 through the flexible printed circuit board.

Step S4: forming a protective layer which covers the light shielding portion 200, the floating touch electrodes and the signal lines 301 on the substrate.

For example, the protective layer can protect the surrounding BM, ITO and metal wires from being scratched. For example, the material of the protective layer can be an inorganic substance such as $SiO_2$, $Si_3N_4$, SiON, etc., or an organic substance such as polytetrafluoroethylene, etc.

For example, the light shielding portion 200, the signal lines 301, and the floating touch electrodes can be manufactured by a printing process (e.g., a screen printing process) or a photolithographic process. The photolithographic process is a process of exposing and developing a photosensitive substance (also referred to as photoresist) coated on a surface of a base substrate, then etching a bottom layer by using the retained part of the photosensitive substance as a mask, and then removing the retained part of the photosensitive substance to obtain a desired pattern.

The sequences of the above steps S1 to S4 can be adjusted according to a product actually manufactured. For example, with respect to a touch substrate used for a small-sized electronic device such as a mobile phone, steps S2 and S3 can be performed, for example, by a same patterning process.

The arrangement manner of the same component in the touch substrate, the manufacturing method thereof, the touch driving method and the electronic device provided by the embodiments of the disclosure can be referred to each another (that is, the arrangement manner of the same component can be the same).

The following statements should be noted: (1) The accompanying drawings involve only the structure(s) in connection with the embodiment(s) of the present disclosure, and other structure(s) can be referred to common design(s); (2) In case of no conflict, the embodiments of the present disclosure and the features in the embodiments can be combined with each other.

What have been described above are only specific implementations of the present disclosure, the protection scope of the present disclosure is not limited thereto. Therefore, the protection scope of the present disclosure should be based on the protection scope of the claims.

What is claimed is:

1. A touch substrate, comprising:
a base substrate having a floating electrode region, wherein the floating electrode region comprises a first floating electrode region and a second floating electrode region sequentially arranged along a first direction, the floating electrode region further comprises a third floating electrode region and a fourth floating electrode region sequentially arranged along a second direction, the second direction is intersected with the first direction, and the first floating electrode region, the third floating electrode region, the second floating electrode region, and the fourth floating electrode region are sequentially arranged along a clockwise direction;
a plurality of floating touch electrodes in the floating electrode region of the base substrate, wherein the plurality of floating touch electrodes comprise a plurality of first touch electrode groups sequentially arranged along the second direction, each of the plurality of first touch electrode groups comprises a first floating touch electrode in the first floating electrode region and a second floating touch electrode in the second floating electrode region, the plurality of floating touch electrodes further comprise a plurality of second touch electrode groups sequentially arranged along the first direction, each of the plurality of second touch electrode groups comprises a third floating touch electrode in the third floating electrode region and a fourth floating touch electrode in the fourth floating electrode region;
a plurality of signal lines on the base substrate, wherein the first floating touch electrode and the second floating touch electrode comprised in a same first touch electrode group are electrically connected with different ones of the signal lines, and the third floating touch electrode and the fourth floating touch electrode comprised in a same second touch electrode group are electrically connected with different ones of the signal lines, and
a floating touch control circuit, configured to apply a driving signal to the first floating touch electrode and the second floating touch electrode comprised in the same first touch electrode group to generate a non-zero voltage difference between the first floating touch electrode and the second floating touch electrode, and in a process of applying the driving signal, apply a sensing signal to the third floating touch electrodes comprised in the plurality of second touch electrode groups, and detect an output signal of the fourth floating touch electrodes comprised in the plurality of second touch electrode groups.

2. The touch substrate according to claim 1, wherein the base substrate further has a central region, and the floating electrode region is a frame region at a periphery of the central region.

3. The touch substrate according to claim 1, wherein, in the same first touch electrode group, in the second direction, one of the first floating touch electrode and the second floating touch electrode is located between two ends of the other of the first floating touch electrode and the second floating touch electrode.

4. The touch substrate according to claim 1, wherein, for the plurality of first touch electrode groups, each first floating touch electrode corresponds to one second floating touch electrode, and each second floating touch electrodes corresponds to one first floating touch electrode.

5. The touch substrate according to claim 1, wherein an orthographic projection of a part of the plurality of signal lines on the base substrate is overlapped with an orthographic projection of a part of the plurality of floating touch electrodes on the base substrate.

6. The touch substrate according to claim 1, wherein a distance between adjacent ones of the plurality of first touch electrode groups and a distance between adjacent ones of the plurality of second touch electrode groups are both greater than or equal to 1 mm.

7. The touch substrate according to claim 1, wherein, in the first direction, a distance between the first floating touch electrode and the second floating touch electrode comprised in the same first touch electrode group is greater than or equal to 1 mm.

8. The touch substrate according to claim 1, wherein, in both the first direction and the second direction, sizes of the first floating touch electrode and the second floating touch electrode are all greater than or equal to 1 mm.

9. The touch substrate according to claim 1, further comprising:
a light shielding portion, wherein the plurality of floating touch electrodes and the plurality of signal lines are located within a region where an orthographic projection of the light shielding portion on the base substrate is located.

10. An electronic device, comprising the touch substrate according to claim 1.

11. The electronic device according to claim 10, further comprising:
a non-floating touch structure, wherein the floating electrode region is at a periphery of an orthographic projection of the non-floating touch structure on the base substrate.

12. The electronic device according to claim 11, wherein the electronic device comprises:
a non-floating touch device, comprising an array substrate and the non-floating touch structure, wherein the array substrate comprises a plurality of switches arranged in an array; and
a bonding adhesive, located between the non-floating touch device and the touch substrate and bonding the non-floating touch device to the touch substrate.

13. The electronic device according to claim 12, wherein the array substrate is a display panel.

14. A touch driving method of the touch substrate according to claim 1, comprising:
applying the driving signal to the first floating touch electrode and the second floating touch electrode comprised in the same first touch electrode group to generate the non-zero voltage difference between the first floating touch electrode and the second floating touch electrode; and
in the process of applying the driving signal, applying the sensing signal to the third floating touch electrodes comprised in the plurality of second touch electrode groups, and detecting the output signal of the fourth floating touch electrodes comprised in the plurality of second touch electrode groups.

15. The touch substrate according to claim 1, wherein at least one of the driving signal and the sensing signal is an alternating current signal.

16. The touch substrate according to claim 1, wherein the floating touch control circuit is configured to: drive the plurality of first touch electrode groups one by one; and/or apply the sensing signal to the third floating touch electrodes comprised in the plurality of second touch electrode groups one by one, and detect the output signal of the fourth floating touch electrodes comprised in the plurality of second touch electrode groups one by one.

17. A touch substrate, comprising:
a base substrate having a floating electrode region, wherein the floating electrode region comprises a first floating electrode region and a second floating electrode region sequentially arranged along a first direction, the floating electrode region further comprises a third floating electrode region and a fourth floating electrode region sequentially arranged along a second direction, the second direction is intersected with the first direction, and the first floating electrode region, the third floating electrode region, the second floating electrode region, and the fourth floating electrode region are sequentially arranged along a clockwise direction;
a plurality of floating touch electrodes in the floating electrode region of the base substrate, wherein the plurality of floating touch electrodes comprise a plurality of first touch electrode groups sequentially arranged along the second direction, each of the plurality of first touch electrode groups comprises a first floating touch electrode in the first floating electrode region and a second floating touch electrode in the second floating electrode region, the plurality of floating touch electrodes further comprise a plurality of second touch electrode groups sequentially arranged along the first direction, each of the plurality of second touch electrode groups comprises a third floating touch electrode in the third floating electrode region and a fourth floating touch electrode in the fourth floating electrode region; and
a plurality of signal lines on the base substrate, wherein the first floating touch electrode and the second floating touch electrode comprised in a same first touch electrode group are electrically connected with different ones of the signal lines, and the third floating touch electrode and the fourth floating touch electrode comprised in a same second touch electrode group are electrically connected with different ones of the signal lines,
in an N-th first touch electrode group, in the second direction, the first floating touch electrode is located between two ends of the second floating touch electrode; and
in an (N+1)-th first touch electrode group adjacent to the N-th first touch electrode group, in the second direction, the second floating touch electrode is located between two ends of the first floating touch electrode.

18. A touch substrate, comprising:
a base substrate having a floating electrode region, wherein the floating electrode region comprises a first floating electrode region and a second floating electrode region sequentially arranged along a first direction, the floating electrode region further comprises a third floating electrode region and a fourth floating electrode region sequentially arranged along a second direction, the second direction is intersected with the first direction, and the first floating electrode region, the third floating electrode region, the second floating electrode region, and the fourth floating electrode region are sequentially arranged along a clockwise direction;
a plurality of floating touch electrodes in the floating electrode region of the base substrate, wherein the plurality of floating touch electrodes comprise a plurality of first touch electrode groups sequentially arranged along the second direction, each of the plurality of first touch electrode groups comprises a first floating touch electrode in the first floating electrode region and a second floating touch electrode in the second floating electrode region, the plurality of floating touch electrodes further comprise a plurality of second touch electrode groups sequentially arranged along the first direction, each of the plurality of second touch electrode groups comprises a third floating touch electrode in the third floating electrode region and a fourth floating touch electrode in the fourth floating electrode region; and a plurality of signal lines on the base substrate, wherein the first floating touch electrode and the second floating touch electrode comprised in a same first touch electrode group are electrically connected with different ones of the signal lines, and the third floating touch electrode and the fourth floating touch electrode comprised in a same second touch electrode group are electrically connected with different ones of the signal lines, in the first direction, a ratio of a distance between the first floating touch electrode and the second floating touch electrode comprised in the same first touch electrode group to a size of each of the first floating touch electrode and the second floating touch electrode is greater than or equal to 100.

* * * * *